US009533756B2

(12) United States Patent
Cox et al.

(10) Patent No.: US 9,533,756 B2
(45) Date of Patent: Jan. 3, 2017

(54) METHOD FOR DEFINING AND CONTROLLING AIRCRAFT TAXI PROFILE

(71) Applicant: Borealis Technical Limited, North Plains, OR (US)

(72) Inventors: Isaiah W. Cox, London (GB); Rodney T. Cox, North Plains, OR (US); Aaron Z. Sichel, Gaithersburg, MD (US)

(73) Assignee: Borealis Technical Limited, Gibraltar (GI)

(*) Notice: Subject to any disclaimer, the term of this patent is extended or adjusted under 35 U.S.C. 154(b) by 38 days.

(21) Appl. No.: 14/531,339

(22) Filed: Nov. 3, 2014

(65) Prior Publication Data

US 2016/0122007 A1    May 5, 2016

(51) Int. Cl.
| | | |
|---|---|---|
| *B64C 25/40* | (2006.01) | |
| *G05D 1/00* | (2006.01) | |
| *G05D 17/02* | (2006.01) | |
| *G08G 5/06* | (2006.01) | |

(52) U.S. Cl.
CPC .......... *B64C 25/405* (2013.01); *G05D 1/0083* (2013.01); *G05D 17/02* (2013.01); *G08G 5/065* (2013.01); *Y02T 50/823* (2013.01)

(58) Field of Classification Search
CPC ..... B24C 25/405; G08G 5/065; Y02T 50/823; G05D 1/0083; G05D 17/02
USPC ................................................ 244/50, 103 S
See application file for complete search history.

(56) References Cited

U.S. PATENT DOCUMENTS

| | | | |
|---|---|---|---|
| 6,150,780 A | 11/2000 | Young et al. | |
| 6,657,334 B1 | 12/2003 | Edelson | |
| 6,694,249 B1 * | 2/2004 | Anderson | G01C 23/00 340/947 |
| 6,838,791 B2 | 1/2005 | Edelson | |
| 7,116,019 B2 | 10/2006 | Edelson | |
| 7,445,178 B2 * | 11/2008 | McCoskey | B64F 1/32 244/100 R |
| 7,469,858 B2 | 12/2008 | Edelson | |

(Continued)

OTHER PUBLICATIONS

Bureau of Transportation Statistics, "Sitting on the runway: current aircraft taxi times now exceed pre-9/11 experience", Special Report by Bruce Goldberg and David Chesser, 2008, 3 pages.*

(Continued)

*Primary Examiner* — Behrang Badii
*Assistant Examiner* — David Testardi

(57) ABSTRACT

A system and method are provided for defining, optimizing, and controlling taxi profiles for aircraft equipped with onboard non-engine drive means controllable to drive one or more nose or main landing gear wheels to drive an aircraft autonomously during taxi. An onboard taxi profile control system may employ smart software to determine selected taxi operational data at an airport and use this data to control and maintain torque of the drive means at desired selected levels that move the aircraft during taxi in response to determined taxi data or predetermined programmed taxi parameters. The system is designed to set default taxi profiles for each taxi cycle to achieve efficient aircraft taxi and to extend operational life of drive means components. Taxi profiles are modified and updated at periodic intervals or in real time in response to actual taxi conditions to optimize aircraft taxi at a specific airport.

15 Claims, 2 Drawing Sheets

(56) References Cited

U.S. PATENT DOCUMENTS

| | | | |
|---|---|---|---|
| 2007/0282491 A1* | 12/2007 | Cox .................. | B64C 25/40 701/3 |
| 2008/0147252 A1* | 6/2008 | Bayer ................ | B64C 25/50 701/3 |
| 2009/0150009 A1* | 6/2009 | Villaume ............ | G08G 5/065 701/3 |
| 2009/0150011 A1* | 6/2009 | Villaume ............ | G01C 23/00 701/3 |
| 2009/0218440 A1 | 9/2009 | Dilmaghani et al. | |
| 2009/0261197 A1* | 10/2009 | Cox .................. | B64C 25/36 244/50 |
| 2010/0276535 A1 | 11/2010 | Charuel et al. | |
| 2011/0276226 A1* | 11/2011 | Lemay .............. | B64C 25/405 701/41 |
| 2012/0018574 A1* | 1/2012 | Bayer ............... | B64C 25/405 244/50 |
| 2012/0292437 A1* | 11/2012 | Garcia .............. | B64C 25/405 244/58 |
| 2013/0131888 A1* | 5/2013 | Nutaro .............. | G08G 5/0021 701/1 |
| 2013/0297102 A1* | 11/2013 | Hughes ............. | G05D 1/0083 701/3 |
| 2014/0114557 A1* | 4/2014 | Nutaro .............. | G01C 21/00 701/121 |
| 2014/0278037 A1* | 9/2014 | Choksi .............. | G08G 5/065 701/120 |
| 2015/0154874 A1* | 6/2015 | Murthy .............. | G08G 5/06 701/120 |
| 2015/0175257 A1* | 6/2015 | Gorce ............... | B64C 25/405 701/3 |
| 2015/0298817 A1* | 10/2015 | Jackson ............. | B64D 45/00 701/3 |
| 2015/0375854 A1* | 12/2015 | Abel ................. | G05D 1/0083 244/50 |
| 2016/0012736 A1* | 1/2016 | Nutaro .............. | G08G 5/065 701/3 |

OTHER PUBLICATIONS

Slutsken, Howard, "Ramp operations—what's going on out there?", Airline Reporter, Jul. 8, 2014, 17 pages.*

Airbus, FAST 51 (technical magazine) article entitled "eTaxi", Jan. 2013, pp. 2 to 10.*

Schwarze, M.C., "Operation and performance evaluation of novel electric-wheel-driven hybrid-electric propulsion systems on standard short range passenger airplanes", Deutscher Luft-und Raumfahrtkongress 2013 (DLRK 2013), Sep. 10-12, 2013, Stuttgart, Germany, DocumentID: 301445, 17 pages.*

* cited by examiner

METHOD FOR DEFINING AND CONTROLLING AIRCRAFT TAXI PROFILE

TECHNICAL FIELD

The present invention relates generally to aircraft ground travel and taxi parameters and specifically to a method for defining and controlling a taxi profile of an aircraft equipped with onboard non-engine drive means for moving the aircraft autonomously during taxi.

BACKGROUND OF THE INVENTION

Electric motors and the like designed to move vehicles on the ground have been used for some time, often in combination with internal combustion or other engines in hybrid vehicles, although more recently these motors alone have been proposed for driving vehicles. The use of electric motors to power a range of vehicles, from automobiles to buses, has been suggested. Equipping aircraft wheels with motors to move aircraft on the ground without reliance on the aircraft's main engines has also been proposed. Aircraft with one or more wheels powered by an electric or other motor are, ideally, able to taxi autonomously between landing and takeoff under only the power provided by these motors. Although the use of "electric taxi" to move an aircraft on the ground has been described, precisely controlling the electric or other motors suggested for this purpose so that the motors can actually operate with optimum efficiency at taxi speeds has not been suggested.

Dilmagahni et al, in U.S. Patent Application Publication No. 2009/0218440, describe a control system for a powered wheel system for aircraft with two or more motors coupled to aircraft wheels that are independently controlled to move an aircraft on the ground during forward and reverse taxi. The rotary speeds and direction of rotation of the driven aircraft wheels are determined and controlled to steer the aircraft, boost the aircraft's brakes when the motors are decoupled from the wheels, and pre-spin the aircraft's wheels prior to landing. It is not suggested that specific operating parameters of the preferred brushless electric motors other than rotary speed and direction of rotation could, or should, be defined or controlled to optimize aircraft taxi. In U.S. Patent Publication No. 2010/0276535, Charuel et al describe a method of taxiing an aircraft that employs a main taxiing motor, preferably a permanent magnet motor, in at least one aircraft nose wheel and an auxiliary taxi motor in at least one main wheel. A taxiing computer adjusts power first to auxiliary motors and then to main motors. Power supplied to the motors is continuously adapted so that torque delivered to auxiliary motors is reduced to zero when the auxiliary motors are no longer needed to assist the main motors in moving the aircraft. Auxiliary motors are provided with only sufficient power to ensure that they do not generate any resistive torque opposing movement of the aircraft. The control of torque or other parameters of the main taxi motor is not mentioned.

In U.S. Pat. No. 6,150,780, Young et al describe an electric drive system for vehicles, specifically haul trucks, with AC motorized wheels and a motor control that uses motor torque and torque limits and engine horsepower and horsepower limits instead of engine speed to control vehicle travel. The torque available from each wheel motor is based on its respective speed, and the available maximum torque for each wheel motor is determined based on the speed of that individual wheel motor. It is not suggested, however, that this system would function solely with wheel motors in the absence of the operation of the vehicle engine or that motor torque could be determined and controlled in the absence of engine horsepower.

Moving a taxiing aircraft by onboard non-engine drive means, particularly electric drive means, requires the precise determination and control of torque and other drive means parameters to optimize taxi and to extend the operational life of drive means components. Consequently, a need exists for a system and method for defining and controlling torque and other drive means parameters required to produce an optimum aircraft taxi profile and thereby optimize aircraft ground travel.

SUMMARY OF THE INVENTION

It is a primary object of the present invention, therefore, to provide a system and method for defining and controlling a taxi profile of an aircraft to optimize aircraft ground movement during taxi.

It is another object of the present invention to provide a system and method for defining and controlling an aircraft taxi profile for aircraft equipped with onboard non-engine drive means for autonomously driving the aircraft without reliance on the aircraft engines during taxi.

It is an additional object of the present invention to provide a system and method for defining and controlling aircraft taxi profiles for aircraft equipped with one or more electric motors operable and controllable to drive one or more nose landing gear wheels to optimize aircraft taxi.

It is a further object of the present invention to provide a system and method for defining and controlling an aircraft taxi profile to optimize taxi in an aircraft equipped with one or more onboard non-engine drive means controllable to move the aircraft autonomously during taxi that controls and maintains torque of the drive means at desired selected levels during taxi.

It is yet another object of the present invention to provide a system and method for defining and controlling an aircraft taxi profile to optimize taxi in an aircraft equipped with one or more onboard non-engine drive means controllable to move the aircraft autonomously during taxi that defines a taxi profile based on specific airport locations and/or environmental, operational, or other selected conditions and controls aircraft taxi based on a defined taxi profile.

It is yet a further object of the present invention to provide a system and method for optimizing taxi profiles in aircraft equipped with onboard non-engine drive means to move the aircraft autonomously during taxi that includes smart software updated at selected intervals so that the system is capable of learning from experience.

It is a still further object of the present invention to provide a system and method for optimizing taxi profiles in an aircraft equipped with onboard non-engine drive means controllable to move the aircraft autonomously during taxi employing smart software that modifies drive means operation in real time in response to taxi conditions.

It is still another object of the present invention to provide a system and method for optimizing a taxi profile in an aircraft equipped with onboard non-engine drive means to move the aircraft autonomously during taxi that includes the ability to limit the commanded torque and/or speed inputs to maximize the operational life of a mechanical component of the onboard drive means or the operational life of the entire system.

It is still an additional object of the present invention to provide a system and method for optimizing a taxi profile in an aircraft equipped with onboard non-engine drive means to move the aircraft autonomously during taxi that limits torque to extend the run time for taxi, thereby preventing premature overheating associated with repeated start-stop sequences initiated by an aircraft pilot.

The aforesaid objects are satisfied by providing a system and method for defining and controlling aircraft taxi profiles for aircraft equipped with onboard non-engine drive means for autonomously driving the aircraft during taxi without reliance on the aircraft's engines designed to optimize aircraft ground movement during taxi. Aircraft are equipped with one or more onboard non-engine drive means, preferably high phase order electric induction motors, drivingly associated with one or more landing gear wheels, preferably nose wheels. An onboard control system employs smart software to determine selected location and operational data and uses this data to control and maintain the torque of the drive means at desired selected levels to move the aircraft during taxi in response to the determined data and/or predetermined programmed parameters, to extend the operational life of mechanical components connected to or associated with the drive means, and to prevent premature overheating of system components. Default taxi profiles based on aircraft load and/or airport conditions and torque learned at an aircraft's first forward start of a taxi cycle can be set at the beginning of each taxi or flight cycle. Operation of the system and method is designed so that default and other taxi profiles are modified and updated in real time and at selected intervals in response to taxi conditions to optimize taxi at a specific airport where an aircraft is taxiing.

Other objects and advantages will be apparent from the following description, drawings, and claims.

DESCRIPTION OF THE INVENTION

Aircraft taxiing on airport runways and taxiways between landing and takeoff currently use the aircraft main engines to provide the motive power to move the aircraft on the ground. Present taxi processes are dependent on aircraft taxi speed and aircraft waiting time. A departing aircraft must wait for a pushback tug, taxiing aircraft must wait for other traffic at runways and taxiways, and departing aircraft may also have to wait in a queue for takeoff. The aircraft's engines are in operation not only to move the aircraft during taxi, but also during the time periods when aircraft are waiting for other aircraft and ground traffic, as well as in takeoff queues. Consequently, taxi profiles of aircraft at airports tend to be determined not by a precise speed profile, but, rather, by average aircraft speeds between key points and a time when aircraft are likely to arrive at these key points. Aircraft and airports using the system and method of the present invention do not rely on aircraft main engines to move aircraft during taxi and, therefore, eliminate the requirement for tugs to effect pushback, which can substantially reduce or even eliminate waiting time in takeoff queues. In accordance with the present invention, aircraft are equipped with onboard non-engine drive means controllable to move the aircraft autonomously during taxi and pushback without use of or reliance on the aircraft's main engines. Defining and controlling a taxi profile for such an aircraft requires different considerations than for aircraft using only main engines for taxi.

The system and method of the present invention defines and controls aircraft taxi and an aircraft taxi profile essentially by defining, controlling, and maintaining torque of the onboard non-engine drive means as the drive means drives one or more aircraft wheels to move the aircraft effectively on the ground in a manner that results in the extended operational lifetimes of mechanical components. An aircraft using the system and method of the present invention is equipped with one or more onboard non-engine drive means controllable and operable to drive one or more aircraft landing gear wheels and move the aircraft autonomously during taxi. One or more nose landing gear wheels or main landing gear wheels can be equipped with such drive means, which are preferably mounted in or adjacent to a selected wheel or wheels to be driven, but may be mounted in any location where they are drivingly connected with the selected wheel or wheels and capable of driving them to move an aircraft.

Figure 1A:
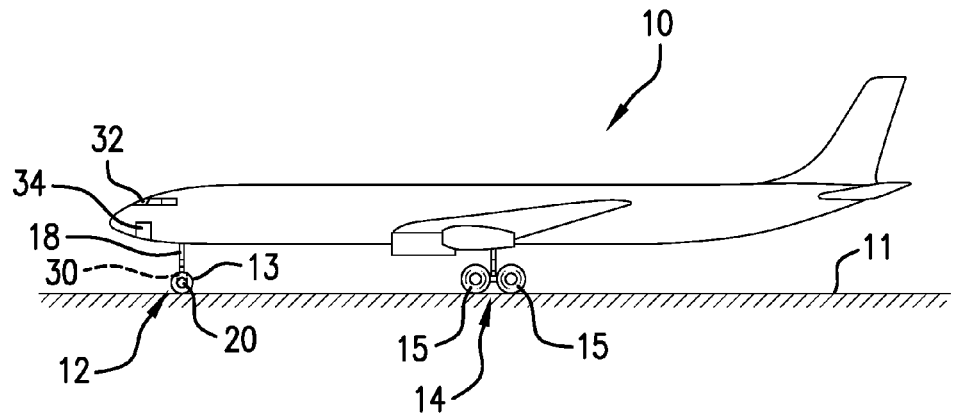
FIGS. 1a and 1b are respective side and front views of an aircraft equipped with onboard non-engine drive means controllable to move the aircraft autonomously during taxi and a system for defining and controlling taxi profile in accordance with the present invention.
Figure 1B:
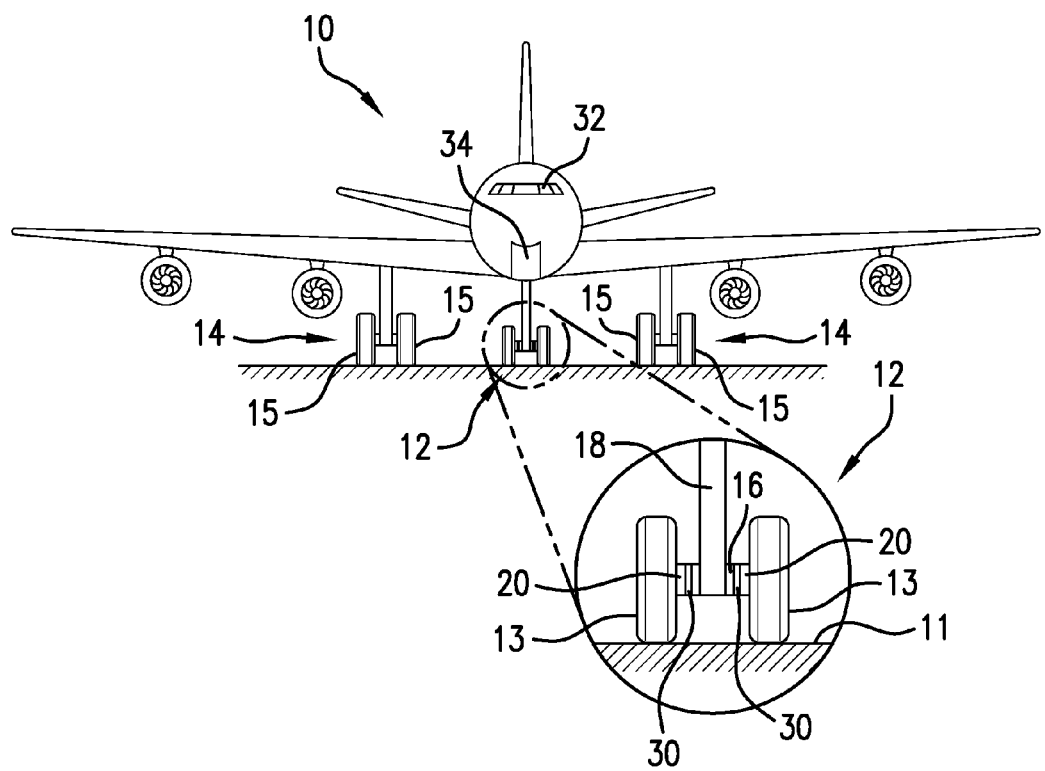

Referring to the drawings, FIGS. 1a and 1b illustrate, in side and front views, respectively, an aircraft 10 on a runway, taxiway, ramp, or other ground surface 11. The aircraft 10 is shown with a nose landing gear 12 and two or more main landing gears 14. One or more of the wheels in these nose or main landing gears is equipped with controllable onboard non-engine drive means as described below. The onboard non-engine drive means can be controlled to power the one or more wheels and drive these wheels to move the aircraft autonomously and independently during taxi and other ground travel without reliance on the aircraft's engines. This substantially eliminates all of the challenges associated with requiring engines designed to move an aircraft during flight to, instead, move the aircraft on the ground.

In one preferred arrangement, a pair of nose landing gear wheels 13 is rotationally mounted on an axle 16, which is secured to a strut 18, part of the nose landing gear. A drive means 20 may be mounted within or adjacent to one or both nose gear wheels 13. As indicated above, the drive means 20 could be mounted in any other location in or on an aircraft relative to a wheel where the drive means can be connected to and drivingly associated with a wheel to provide the power required to drive the wheel. Two drive means 20 are drivingly associated with the two nose landing gear wheels 13 to provide the power required to drive a commercial sized aircraft on the ground, although a single drive means powering a single wheel may be suitable in some situations. The drive means may be located to drive one or more nose landing gear wheels as shown or to drive one or more wheels 15 in one or more of the main landing gears 14. All possible numbers and locations of the wheel or wheels driven by a drive means are contemplated to be within the scope of the present invention.

A drive means controller 30 connected with the cockpit 32 may be provided to allow the precise automatic or manual control of operation of the drive means 20 to drive the aircraft autonomously during taxi and other ground movement to optimize the aircraft's taxi profile as discussed below. Although the drive means controller 30 is shown located in association with the nose landing gear wheels, a drive means controller may be located in association with any aircraft wheel driven by a non-engine drive means to control a nose or main landing gear drive wheel as described herein.

The drive means 20 can be any of a number of possible drive means suitable for powering an aircraft wheel and driving an aircraft autonomously during ground travel without reliance on the aircraft's main engines. Non-engine drive means useful for this purpose may be selected from those known in the art. One preferred drive means is a high phase order electric motor of the kind described in, for example, U.S. Pat. Nos. 6,657,334; 6,838,791; 7,116,019; and 7,469,858, all of which are owned in common with the present invention. A geared motor, such as that shown and described in U.S. Pat. No. 7,469,858, is designed to produce the torque required to move a commercial sized aircraft at an optimum speed for ground movement. The disclosures of the aforementioned patents are incorporated herein by reference. Any form of electric motor capable of driving an aircraft on the ground during ground travel, including but not limited to electric induction motors, permanent magnet brushless DC motors, and switched reluctance motors, as well as other drive means, including, but not limited to, hydraulic pump/motor assemblies and pneumatic motors, may also be used to power drive wheels and move an aircraft autonomously on the ground without reliance on aircraft main engines.

One particularly preferred non-engine drive means, suitable for use in, for example, the Boeing 737 family of aircraft and the Airbus A320 family of aircraft, is a high phase order induction motor with a top tangential speed of about 15,000 linear feet per minute and a maximum rotor speed of about 7200 rpm. With an effective wheel diameter of about 27 inches and an appropriate gear ratio, an optimum top speed of about 28 miles per hour (mph) can be achieved, although any speed appropriate for aircraft ground travel in a particular runway environment could be achieved and maintained. Other motor designs capable of high torque operation across the desired speed range that can be integrated into or otherwise drivingly associated with an aircraft nose or main gear drive wheel to function as described herein may also be suitable for use in defining and controlling an aircraft taxi profile in accordance with the present invention. The term "motor" as used herein is intended to refer to any type of non-engine drive means suitable for driving one or more aircraft wheels autonomously during taxi, including but not limited to, a preferred electric motor.

The aircraft's auxiliary power unit (APU) (not shown) is a preferred source of electric power for powering drive means that require electric power. Other power sources may also be used to supplement or replace the APU as a source of power. These power source may include, for example without limitation, batteries, fuel cells, any kind of solar power, POWER CHIPS™, and burn boxes, as well as any other suitable power source for this purpose. Control of the flow of current to an electric drive means, as well as the voltage and frequency of the current, allows the torque generated by the drive means to be controlled and, therefore, may control the speed of the wheel powered by the drive means and the ground travel speed of the aircraft. In the event the APU or one of the aforementioned power sources is not available, as noted above, electric power may be generated by one or more of the aircraft's engines' auxiliary power units to power the aircraft wheel drive means and keep the aircraft moving on the ground, although this is not preferred and would be employed only in an emergency situation.

In accordance with the present invention, an aircraft taxi profile may be defined that controls and maintains torque of the drive means, whether it is an electric motor preferred for this purpose or another kind of drive means, at desired selected levels during taxi. This avoids operation of the motor at maximum torque unless maximum torque is specifically required, which not only extends the operational life of the motor, but additionally extends the operational life of any component in a drive wheel mechanical drive train subject to fatigue, from the motor to gears to a wheel interface. It is contemplated that the present taxi profile system and method may limit periods when maximum torque is required to not more than about 3 to 5% of the operational life of the system, although it is further contemplated that the specific period may be varied as the system learns from experience as discussed below.

The system of the present invention may include, preferably in connection with drive means control system 30, a simple onboard control system, represented schematically at 34. The onboard control system may include information in a data base available to the control system 34 relating to taxi at all of the airports where an aircraft lands and takes off, or, if desired, all airports capable of handling a class of aircraft equipped with onboard non-engine drive means as described above. Airports where other classes of aircraft may be likely to land and takeoff may also be included in the data base, if desired. For example, a map sized to provide a selected number of global positioning system (GPS) coordinates for these airports may be provided, although any other location identifier data available to aircraft may also be used. A lookup feature for map coordinates or location identifiers may be included. Map coordinates for an airport may divide the airport into zones. The optimum size of a zone can vary from airport to airport. It is contemplated that zones ranging from about 30 feet by 30 feet to about 50 feet by 50 feet may be useful for airport map coordinates, but larger or smaller zones could also be used as the basis for map coordinates.

The number of possible operational aircraft taxi profiles likely numbers in the hundreds of thousands, but is potentially limitless. The use of a numeric digit code may be used to identify a specific taxi profile at an airport, although other identification systems are contemplated to be within the scope of the present invention. If, for example, a two digit code is used to identify each taxi profile corresponding to an airport's map coordinates, the lookup table referred to above may include 99 different operational profiles, and the present system may check in with the lookup table to identify a profile that governs a specific airport location and/or set of selected conditions corresponding to the numeric code. When a larger number of taxi profiles are included in an airport taxi information data base available to the present system, three digit, four digit, or even larger numbers of digit codes may be required to identify this larger number of taxi profiles and match them to airport map coordinates.

In addition to specific information relating to aircraft location at an airport, the database of the present system may also include information relating to environmental, operational, and other conditions that could affect aircraft taxi and are, therefore, an important component of a taxi profile. Such conditions may include, for example without limitation, current temperatures, wind conditions, light conditions, weather conditions, and presence of other aircraft or vehicle ground traffic and/or air traffic, as well as any general security or other concerns. The ready availability of sophisticated, yet inexpensive, miniature memory devices and other electronics enables the present system to include such devices and provide critical real time information to optimize an aircraft's taxi profile. The taxi profiles described above may then be easily optimized based on actual experience.

As an aircraft equipped with the onboard non-engine drive means described herein follows a taxi profile associated with an airport location and/or environmental or other conditions, any changes to the profile required by actual taxi operation may be recorded, preferably in a removable memory card (SD card) of the kind that are commonly used, and these changes may be reviewed when the card is removed and reviewed after an appropriate interval, usually monthly. In this situation, processing to optimize taxi profiles based on recent experience occurs at a headquarters or other location when the SD card is reviewed and updated.

Updating taxi profiles in real time is also contemplated to be within the scope of the present invention. Default taxi profiles can be defined. At an aircraft's first forward acceleration of a flight cycle or start of a taxi cycle, the amount of torque that must be applied to move the aircraft is learned. Baseline torques may be set at the beginning of each aircraft taxi cycle using this information. Every aircraft load and/or airport condition may set a new baseline. Default taxi profiles can be updated periodically when the SD card is reviewed and updated or may be updated in real time as described above.

At most airports, aircraft do not move during taxi without stopping one or more times as they travel on the ground between landing and takeoff. When the locations where aircraft stop are known, a default taxi profile for that particular airport location may be defined. For example, at pushback, aircraft will always be moved in reverse by the onboard non-engine drive means to a location where the aircraft can begin forward taxi to a taxiway for takeoff. The aircraft's reverse taxi and the location of forward taxi movement, which may vary from gate to gate, even at the same airport, may be programmed into a default taxi profile for a specific airport map coordinate that also may include information relating to ground movement of all other aircraft, airport ground vehicles and other airport ground equipment. Additionally, if it is learned, for example, that at a specific airport, there is a location where all aircraft always stop halfway through taxi and then have an open path to the runway, the taxi profile available for the airport location or map coordinates where this occurs may be designed to reflect that situation. It is contemplated that the present system may also provide a large number of alternative aircraft taxi profiles or aircraft movements that may be manually controlled by a pilot in the event it is necessary to override the control system that otherwise automatically directs aircraft taxi. The aircraft pilot would, in such a situation, be able to control the aircraft's ground movement manually.

As indicated above, a taxi profile for an aircraft driven during taxi by onboard drive means should ideally control and maintain the torque of the drive means at a desired selected level during taxi that has been determined to extend the operational life of any mechanical component subject to fatigue connected to or associated with the drive means. Generally, the drive means or motor may be operating at full torque at the first forward start moving an aircraft from a stopped or resting position. Maximum torque will almost always be required to move a fully loaded aircraft that is cold soaked, on a sticky tarmac, or has been sitting long enough for the tires to become slightly deformed. In the vast majority of situations, however, maximum motor torque may not be needed to move a fully loaded aircraft at the first forward start, and motor torque in the range of about 60-90% of maximum torque may be sufficient. For each subsequent full forward start in a taxi cycle, the motor torque may be limited to about 120% of breakaway torque.

A torque level limit can be lifted until the next stop when selected conditions occur, for example if the aircraft has traveled a desired distance and/or has exceeded a desired speed. The torque level limit should be selected to avoid damage to any component mechanically connected to or associated with the drive means. An exemplary situation would lift the motor torque level limit when the aircraft has traveled 500 feet and/or exceeded a speed of 10 miles per hour (mph). Typical stop-and-go conditions may be learned from experience. This information may be included in the lookup table discussed above. Over time, information relating to taxi profiles at specific locations at an airport may be added to the database in the lookup table so that the information available to the system of the present invention may expand to be quite extensive and include a large number of taxi options under a wide range of conditions.

To illustrate, the present system may be designed to know whether an aircraft may be in a start-stop situation as soon as the aircraft first stops after the first forward roll start. The present system provides the freedom to limit motor torque to a point above breakaway torque, but below maximum torque. Consequently, to prevent premature overheating of the drive means and/or associated mechanical structures, the aircraft pilot will not be able to move the aircraft repeatedly at 0-7 mph at maximum torque. After the first acceleration, the system may diminish torque output to a level slightly above the motor torque required to get the aircraft rolling. Further, when an aircraft has moved a distance determined by experience to be a normal stop-and-go distance, and the pilot continues to command full torque, full power may be restored so that the aircraft can be driven at a desired speed to a runway or the next stop point. Limiting torque as described not only prevents premature overheating, but may also extends the operational life of mechanical components, particularly gears, that are subject to fatigue.

The present system may be in operative communication with the aircraft cockpit and onboard location identifier information as well as an airport GPS. As a result, the geographic location of the aircraft is known, and additional information relating to taxi conditions can be learned from the location information. To illustrate, runway congestion can be readily identified, and it can be known quickly that the 5 PM departure on taxiway Alpha is a slow slog. If an aircraft stops on taxiway Alpha at that time, information communicated between the airport GPS and the present system may result in the system reducing motor torque, since experience indicates that the aircraft will be in a start-stop situation as it taxis. In the event that a GPS signal might not be available, default taxi profiles that do not depend on GPS signals may be included in the present system. As indicated above, any other location identifier information available to the aircraft can also be used to define a default taxi profile.

Any additional information that could affect motor operating torque, such as, for example without limitation temperature, aircraft weight, and the like may also be included among the conditions that can affect a taxi profile. When a temperature-based torque determination is used, for example, a temperature sensor or the like monitoring the temperature of the motor, a gear drivingly associated with the motor, or another selected structure with relevant temperature information elsewhere in the aircraft may communicate a temperature reading, and this reading may be compared to a predetermined temperature to indicate whether 100% of maximum motor torque is needed to move the aircraft.

In a weight-based torque determination, the measured or otherwise determined weight of the aircraft, which typically includes the weight of the aircraft plus fuel plus passengers plus luggage plus cargo and the like, may be compared to a predetermined weight to indicate whether 100% of maximum torque is required to move the aircraft. Since aircraft weight and center of gravity information are already computed by flight crew and/or ground personnel and entered into an aircraft's flight computer prior to departure, this information may be readily available to determine torque. One way to calculate breakaway torque can be done using the aircraft location, plus the time of day, plus the time since the aircraft's last motion, plus current temperature, plus aircraft loading and cargo data, plus tire inflation data, plus aircraft type. This data may be combined into a simple index or a vector value that may be used to determine how much power to apply to the drive means.

A taxi profile for an aircraft equipped with onboard non-engine drive means in accordance with the present system and method may be defined as discussed below, although this is not intended to be limiting, and defining taxi profiles for such aircraft may be done in a range of different ways. As discussed above, the present system may be designed to learn from taxi experience and information from a range of sources that are connected with taxi of a specific aircraft, and taxi profiles for specific airports and/or airport map coordinates or location identifiers may be updated as required based on information and data from a variety of sources, including but not limited to system wear and tear characteristics, airline feedback, and the like. The system may also include software capable of learning "on the fly" or in real time, so that the system can learn, for example, how much force is required to move an aircraft under specific conditions and the minimum torque required to break away.

A taxi profile is preferably defined using the following information. A typical taxi speed is about 15 mph. When maximum power from the aircraft APU is applied, the maximum motor torque may be only about 40-60% of the motor design. As taxi speed increases, the percentage of maximum motor torque decreases. For example, at a top taxi speed of about 28 mph, maximum power applied to the system produces acceleration very close to zero. As a result, the system spends more than about 50% of its operational time at less than about 50% of motor maximum torque. For almost every situation, it is expected that maximum motor torque may be limited to no more than two forward aircraft starts during each taxi cycle. During a total taxi time of about 19 minutes, this represents about 20-30 seconds, or about 2.5% of an aircraft's taxi time. For starts other than forward starts, the maximum motor torque can be limited to in the range of about 60-80% of maximum, although this level may be modified for specific situations, depending on other preferences or considerations. As noted above, limiting torque as described prevents the premature heating that accompanies repeated start-stop situations when a pilot commands maximum torque and extends the operational life of mechanical components associated with the drive means. The present system also provides the ability to customize the percentage of drive means operational life during which maximum motor torque may be applied based on operating data, which may permit optimization of the system.

It is preferred that operation of the present system be controlled automatically with appropriate pilot input in conjunction with smart software designed to communicate with aircraft and airport GPS or other location identifier information and other control and data systems to define and control an aircraft's taxi profile. The present invention additionally may include an override function that may enable an aircraft pilot or crew member to override any of the system functions when required to avoid compromising the safety of the aircraft or other aircraft and/or ground vehicles. A suitable override control, as well as other controls to manually operate the system, may be included among the controls available to the pilot and flight crew in the aircraft cockpit 32.

Figure 2:
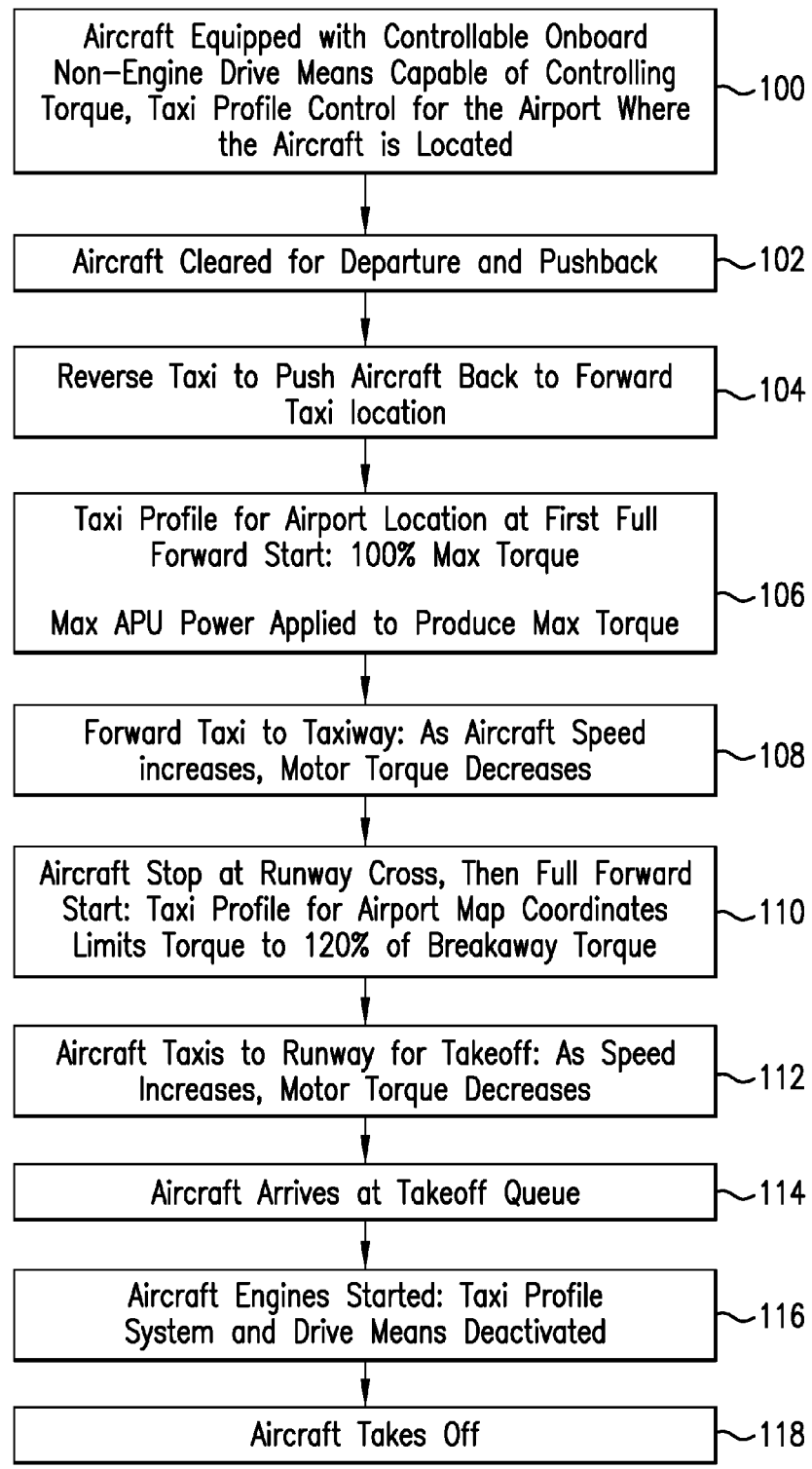
FIG. 2 is a flow chart of a method for defining and controlling aircraft taxi profile for an aircraft equipped with onboard non-engine drive means controllable to move the aircraft autonomously during taxi.

FIG. 2 illustrates the use of the system of the present invention in a method in accordance with the present invention to define and control a taxi profile of a departing aircraft. Since an arriving aircraft will be in motion after landing and does not require pushback, the taxi profile of a landing aircraft may be slightly different, but the considerations discussed herein may still apply. In the step represented at box 100, an aircraft is equipped with onboard non-engine drive means to move the aircraft autonomously during taxi. The aircraft additionally has a GPS or other source of location identifier, is in operative communication with an airport GPS, and the present system with smart software, preferably including a map of the airport and taxi profiles designed for designated location and/or map coordinates. When the aircraft is cleared for departure and pushback, represented at box 102, there is no delay caused by an unavailable tug, and the onboard drive means is activated to drive the aircraft in reverse away from a gate or parking location to a forward taxi location, as described in box 104. In the step represented at box 106, the taxi profile for the airport location or map coordinates for this location will indicate application of 100% of maximum motor torque, since this is the aircraft's first forward start. Additionally, maximum APU power will be applied to produce 100% of maximum torque to move the aircraft forward. As the aircraft taxis forward to a taxiway, its speed increases, and the motor torque decreases, which is represented in box 108. When the aircraft comes to a full stop at a runway cross (box 110) the airport map coordinates or location taxi profile preferably limits the torque to 120% of breakaway torque as the aircraft moves forward from its second full stop. The aircraft taxis to a takeoff runway, and, as its speed approaches 28 mph, the motor torque decreases to zero, which is represented in box 112. In the step shown in box 114, the aircraft arrives at a takeoff queue and stops again. Depending where the aircraft stops in relation to the location where the aircraft must start its engines for takeoff, the aircraft's forward taxi may be controlled by the taxi profile for this location or by the aircraft's main engines. When the aircraft's engines have been started prior to takeoff, the taxi profile system is no longer needed, and this system and the onboard drive means are deactivated, as represented in box 116. The aircraft then taxis to a takeoff location and takes off, as indicated in box 118. FIG. 2 is not intended to be limiting, but is an illustration of only one of many possible taxi profiles of a departing aircraft in accordance with the present invention. There are, in addition, variations of this taxi profile that may be capable of achieving the same or a similar result.

The taxi profile of an arriving aircraft may be defined and controlled as described above when the aircraft's engines are turned off after touch down and the onboard non-engine drive means is activated to move the aircraft autonomously to a gate or parking location. An arriving aircraft will be taxiing forward during arrival, but is also likely to have to stop at runway crossings or in other situations, in which the taxi profile will be defined and motor torque controlled to optimize aircraft taxi as described above.

While the present invention has been described with respect to preferred embodiments, this is not intended to be limiting, and other arrangements and structures that perform the required functions are contemplated to be within the scope of the present invention.

INDUSTRIAL APPLICABILITY

The present invention will find its primary applicability where it is desired to define and control taxi profile and optimize taxi in aircraft equipped with onboard non-engine drive means for autonomously moving aircraft during taxi and ground travel at an airport.

The invention claimed is:

1. An aircraft taxi system using aircraft taxi profiles including torque level limits selected to optimize aircraft taxi at an airport comprising:
   a. an aircraft equipped with one or more nose landing gear wheel-mounted onboard non-engine drive means for generating an operating torque and controllable to transfer torque to move the aircraft autonomously at taxi speeds during ground travel, wherein said drive means comprises one or more electric drive motors selected from the group comprising high phase order electric motors, electric induction motors, permanent magnet brushless DC motors, and switched reluctance motors powered by an auxiliary power unit of said aircraft;
   b. one or more onboard non-engine drive means control systems in operative communication with each of the one or more onboard non-engine drive means and with an aircraft cockpit;
   c. a control system onboard the aircraft in control communication with said one or more onboard non-engine drive means control systems and with automatic controls activatable to produce a maximum torque or a selected percentage of torque less than the maximum torque as required to move the aircraft from a first full forward start, to limit operation of the one or more electric drive motors to a motor torque level limit below the maximum torque at subsequent full forward starts in a taxi cycle, and to lift the motor torque level limit when the aircraft has traveled a selected distance or exceeded a selected speed; and
   d. a plurality of updatable aircraft taxi operational profiles in a database of said control system identified by an operational profile code defining taxi parameters for zones defined by map coordinates in each airport where the aircraft lands and takes off, wherein said plurality of updatable taxi operational profiles are used by the control system to govern a level of non-engine drive means torque required for taxi by the aircraft at specific airport locations for each airport where the aircraft lands and takes off within the motor torque level limit.

2. A method for defining and controlling taxi profiles at torque level limits selected to optimize aircraft taxi at an airport comprising:
   a. equipping an aircraft with one or more nose landing gear wheel-mounted onboard non-engine drive means for generating operating torque controllable to transfer torque to move the aircraft autonomously at taxi speeds during ground travel, comprising one or more electric drive motors capable of driving a commercial size aircraft on the ground selected from the group comprising high phase order electric motors, electric induction motors, permanent magnet brushless DC motors, and switched reluctance motors powered by an aircraft auxiliary power unit;
   b. providing a plurality of aircraft taxi operational profiles for each airport where said aircraft lands and takes off;
   c. controlling aircraft taxi at a selected airport where said aircraft is taxiing in response to one or more selected ones of the plurality of aircraft taxi operational profiles by controlling the one or more electric drive motors to produce a maximum torque or a selected percentage of torque less than the maximum torque as required to move the aircraft from a first full forward start and limiting operation of the one or more electric drive motors to a motor torque level limit below the maximum torque at subsequent full forward starts in a taxi cycle, wherein the one or more electric drive motors are further controlled to lift the motor torque level limit when the aircraft has traveled a selected distance or the aircraft has exceeded a selected speed;
   d. controlling torque of said one or more electric drive motors to move said aircraft autonomously during taxi at a determined torque defined by the one or more selected aircraft taxi operational profiles and within the maximum torque; and
   e. updating said plurality of aircraft taxi operational profiles in real time or at periodic intervals based on actual taxi conditions to optimize taxi of said aircraft in response to the actual taxi conditions.

3. The method of claim 2, further comprising defining one of said plurality of aircraft taxi operational profiles at a selected airport that controls and maintains torque of the one or more electric drive motors by determining taxi speed at the selected airport, determining percentage of maximum motor torque of the electric drive motor design produced when maximum power is applied by the auxiliary power unit, determining electric drive motor operational time spent at less than the maximum motor torque, and determining percentage of aircraft taxi time at the maximum motor torque.

4. The method of claim 1, further comprising providing location information and condition information at a selected airport to said plurality of aircraft taxi operational profiles and updating said location information and condition information at periodic intervals or in real time.

5. The method of claim 4, further comprising providing in real time the location of said aircraft and all other aircraft, vehicles, and equipment on the ground and locations of departing, arriving, and airborne aircraft for each of a plurality of map coordinates corresponding to airport map locations and updating said location information in real time.

6. The method of claim 4, further comprising providing condition information selected from information comprising temperature, wind speed, ground surface conditions, light, weather, and traffic conditions and updating said condition information in real time.

7. The method of claim 1, further comprising, for a selected aircraft taxi operational profile, defining an optimal maximum torque for the selected aircraft operational taxi profile, limiting time periods during aircraft taxi when the one or more electric drive motors operating torque is equal to said maximum torque to a percentage of operational life of said one or more electric drive motors, and varying said limited time periods as the selected aircraft taxi operational profile is updated.

8. The method of claim 7, further comprising limiting the time periods of maximum torque to not more than 3% to 5% of operational life of said one or more electric drive motors.

9. The method of claim 7, further comprising limiting the operating torque of the one or more electric drive motors to a torque level below said maximum torque and above a breakaway torque.

10. The method of claim 2, further comprising controlling said one or more electric drive motors during a start-stop situation to lift the motor torque level limit as said aircraft taxis when said aircraft has traveled a selected distance or has exceeded a selected speed.

11. The method of claim 10, wherein said selected distance comprises 500 feet and said selected speed is 10 miles per hour.

12. The method of claim 2, further comprising defining a default taxi profile, wherein said default taxi profile comprises defining a baseline torque to be applied by said one or more electric drive motors after a first forward acceleration in a taxi cycle, and defining a new default taxi profile setting a new baseline torque based on aircraft load and airport conditions at the beginning of each aircraft taxi cycle.

13. The method of claim 2, further comprising providing a control system database with taxi conditions at all airports where said aircraft lands or takes off and providing a look up table with operational aircraft taxi profiles for a selected class or classes of aircraft that includes said aircraft, selecting an optimal taxi profile for said aircraft at a specific airport, and controlling taxi of said aircraft in response to said taxi conditions in real time to maintain operation of the one or more electric drive motors at the motor torque level limit below the maximum torque.

14. The method of claim 13, further comprising updating said control system database and said operational aircraft taxi profiles in response to actual taxi conditions in real time or at a later time.

15. A method for defining and controlling taxi profiles at torque level limits selected to optimize aircraft taxi at an airport comprising:
  a. equipping an aircraft with one or more nose landing gear wheel-mounted onboard non-engine drive means for generating operating torque controllable to transfer torque to move the aircraft autonomously at taxi speeds during ground travel, comprising one or more electric drive motors capable of driving a commercial size aircraft on the ground selected from the group comprising high phase order electric motors, electric induction motors, permanent magnet brushless DC motors, and switched reluctance motors powered by an aircraft auxiliary power unit;
  b. providing a plurality of aircraft taxi operational profiles for each airport where said aircraft lands and takes off;
  c. controlling aircraft taxi at a selected airport where said aircraft is taxiing in response to one or more selected ones of the plurality of aircraft taxi operational profiles by controlling the one or more electric drive motors to produce a maximum torque or a selected percentage of torque less than the maximum torque as required to move the aircraft from a first full forward start and limiting operation of the one or more electric drive motors to a motor torque level limit below the maximum torque at subsequent full forward starts in a taxi cycle, wherein the one or more electric drive motors are further controlled to lift the motor torque level limit when the aircraft has traveled a selected distance or the aircraft has exceeded a selected speed;
  d. controlling torque of said one or more electric drive motors to move said aircraft autonomously during taxi at a determined torque defined by the one or more selected aircraft taxi operational profiles and within the maximum torque; and
  e. updating said plurality of aircraft taxi operational profiles in real time or at periodic intervals based on actual taxi conditions to optimize taxi of said aircraft in response to the actual taxi conditions, and
further comprising defining and controlling an aircraft taxi operational profile for a departing aircraft driven by the one or more electric drive motors in reverse to an airport forward taxi location where the aircraft taxi operational profile indicates application of 100% of maximum motor torque to move the aircraft forward to a taxiway, then controlling the aircraft taxi operational profile to increase aircraft speed and decrease motor torque during taxi, stopping the aircraft at a runway cross and then moving the aircraft forward at a torque limited to 120% of breakaway torque until aircraft speed is about 28 miles per hour and motor torque decreases to zero before the aircraft stops in a takeoff queue and the one or more electric drive motors are deactivated.

* * * * *